United States Patent
Kaluza (10) Patent No.: US 12,417,635 B2
(45) Date of Patent: Sep. 16, 2025

(54) METHOD FOR MONITORING THE SECURING OF A ROAD CONSTRUCTION SITE

(71) Applicant: CM1 GmbH, Lauf an der Pegnitz (DE)

(72) Inventor: Sebastian Kaluza, Munich (DE)

(73) Assignee: CM1 GmbH, Lauf an der Pegnitz (DE)

( * ) Notice: Subject to any disclaimer, the term of this patent is extended or adjusted under 35 U.S.C. 154(b) by 365 days.

(21) Appl. No.: 18/112,326

(22) Filed: Feb. 21, 2023

(65) Prior Publication Data
US 2023/0196781 A1 Jun. 22, 2023

Related U.S. Application Data

(63) Continuation-in-part of application No. PCT/EP2021/073183, filed on Aug. 20, 2021.

(30) Foreign Application Priority Data

Aug. 21, 2020 (EP) ..................................... 20192076

(51) Int. Cl.
*G06V 20/52* (2022.01)
*G06V 20/70* (2022.01)
(Continued)

(52) U.S. Cl.
CPC ............... *G06V 20/52* (2022.01); *G06V 20/70* (2022.01); *G08B 21/18* (2013.01); *H04N 23/633* (2023.01); *H04N 23/671* (2023.01)

(58) Field of Classification Search
CPC ........ G06V 20/52; G06V 20/70; G08B 21/18; H04N 23/633; H04N 23/671; G08G 1/0955; G08G 1/097; E01F 13/02; E01F 9/688
See application file for complete search history.

(56) References Cited

U.S. PATENT DOCUMENTS

| 9,817,839 | B2 * | 11/2017 | Kahle | ..................... G06F 16/16 |
| 11,568,648 | B2 * | 1/2023 | Kim | ..................... G06V 10/774 |
| 2020/0240095 | A1 * | 7/2020 | Rizzo | ..................... E01F 9/608 |

FOREIGN PATENT DOCUMENTS

| DE | 202018104246 U1 | 11/2018 | |
| DE | 102014104573 B4 * | 3/2019 | ........... G06G 1/0967 |

(Continued)

OTHER PUBLICATIONS

International search report dated Nov. 11, 2021, and the Written Opinion from the European Patent Office in the parent international application PCT/EP2021/073183 (16 pages).

*Primary Examiner* — Tom Y Lu
(74) *Attorney, Agent, or Firm* — Imperium Patent Works; Darien K. Wallace (57) ABSTRACT

Safety markers are used to monitor the security situation surrounding a construction site. A position data set indicates a current position of a safety marker. A reference image data set indicates an initial state of the security situation, and a control image data set indicates a current state of the security situation. The position data set, the reference image data set and the control image data set are transmitted to a central processing unit. A correction data set is determined by evaluating the reference image data set and the control image data set. The position data set is corrected using the correction data set to generate a corrected position data set. The current position of the safety marker as indicated by the corrected position data set is compared to a target position of the safety marker. An alarm signal is generated if the current position deviates from the target position.

18 Claims, 6 Drawing Sheets

(51) Int. Cl.
*G08B 21/18* (2006.01)
*H04N 23/63* (2023.01)
*H04N 23/67* (2023.01)

(56) References Cited

FOREIGN PATENT DOCUMENTS

GB 2577367 A 3/2020
WO WO2019/069104 A1 4/2019

\* cited by examiner

METHOD FOR MONITORING THE SECURING OF A ROAD CONSTRUCTION SITE

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2021/073183, filed on Aug. 20, 2021, and published as WO 2022/038278 A1 on Feb. 24, 2022, which in turn claims priority from European Application No. 20192076.6, filed in the European Patent Office on Aug. 21, 2020. This application is a continuation-in-part of International Application No. PCT/EP2021/073183, which is a continuation of European Application No. 20192076.6. International Application No. PCT/EP2021/073183 is pending as of the filing date of this application, and the United States is an elected state in International Application No. PCT/EP2021/073183. This application claims the benefit under 35 U.S.C. § 119 from European Application No. 20192076.6. The disclosure of each of the foregoing documents is incorporated herein by reference.

TECHNICAL FIELD

The invention relates to a method for monitoring the securing of a road construction site and the associated security situation.

BACKGROUND

Road construction sites on traffic routes, such as public roads, require protection and safeguarding. For this purpose, the first step is to draw up a traffic ordinance for the road construction site to be secured, which may be submitted to a competent authority for approval.

The traffic ordinance contains instructions and requirements for traffic safety for work on or next to a road. Signage and road markings are described and specified in detail. The traffic ordinance is then implemented. For this purpose, safety equipment is set up in accordance with the traffic law guidelines.

Furthermore, a control of the security situation of the road construction site is prescribed at predetermined time intervals, usually several times a day, which is very personnel intensive. To remedy this situation, German patent DE102014104573B4 describes an automated method for securing road construction sites on traffic routes, in which a machine-readable security plan is made available to a technical control unit. The technical control unit carries out an automated control and checks whether the implemented safeguarding complies with the specifications of the machine-readable safeguarding plan. For this purpose, the position of a road safety marker is determined with a GPS system assigned to the road safety marker and transmitted to the control unit, which performs a comparison with the machine-readable safeguarding plan. However, GPS systems have only limited accuracy, so not all deviations can be reliably detected.

The patent documents DE102018007632A1 and EP3629312A1 disclose another system for determining the position of traffic guidance devices, in which the system comprises a position-determining sensor unit in addition to an interface unit. Furthermore, the sensor unit may comprise a gyroscope, an accelerometer, a magnetometer, a barometer, a humidity sensor or a temperature sensor. A common feature of the state of the art is that all the systems mentioned there can only inaccurately detect the position of the traffic guidance devices.

There is a need to show ways to achieve accurate position detection of traffic guidance devices at road construction sites in a simple manner.

SUMMARY

The invention relates to a method for monitoring the securing of a road construction site, comprising securing the road construction site using a safety marker that includes a navigation module, a camera and a data-transfer device for wireless data transfer, determining using the navigation module a position data set (PDS) indicating a current actual position of the safety marker, capturing using the camera a reference image data set (RDS) indicating an initial state of the safety marker, capturing a control image data set (KDS) indicating a current state of the safety marker, determining by evaluating the reference image data set (RDS) and the control image data set (KDS) a correction data set (KRS) for correcting the position data set (PDS), correcting the position data set (PDS) on the basis of the correction data set (KRS) in order to generate a corrected position data set (PDS'), comparing the actual position according to the corrected position data set (PDS') with a predetermined target position of the safety marker, and generating an alarm signal (AS1) if the actual position deviates from the target position.

A novel method for monitoring the security situation surrounding a road construction site uses a safety marker that includes a navigation module, a camera and a data transmission device for wireless data transmission. The navigation module is used to determine a position data set (PDS) indicative of a current position of the safety marker. The position data set (PDS) is transmitted to a central processing unit. The camera is used to capture a reference image data set (RDS) indicative of an initial state of the security situation. The reference image data set (RDS) is transmitted to the central processing unit. A control image data set (KDS) is acquired that is indicative of a current state of the security situation. The control image data set (KDS) is transmitted to the central processing unit. For correcting the position data set (PDS), a correction data set (KRS) is determined by evaluating the reference image data set (RDS) and the control image data set (KDS). The position data set (PDS) is corrected using the correction data set (KRS) to generate a corrected position data set (PDS'). The current position of the safety marker as indicated by the corrected position data set (PDS') is compared to a predetermined target position of the safety marker. An alarm signal (AS1) is generated if the current position deviates from the target position.

The correction data set (KRS) is determined by (1) searching for an optically distinctive reference point (RP) in the reference image data set (RDS), (2) determining a point in the reference image data set (RDS) indicative of a position of the optically distinctive reference point (RP), (3) searching for the optically distinctive reference point (RP) in the control image data set (KDS), (4) determining a control point position data set (KPS) indicative of the position of the optically distinctive reference point (RP) in the control image data set (KDS), and (5) determining the correction data set (KRS) by comparing the point in the reference image data set (RDS) to the control point position data set (KPS). A trained artificial neural network is used to search for the optically distinctive reference point (RP) in the reference image data set (RDS) and to search for the optically distinctive reference point (RP) in the control image data set (KDS).

A computer program product is used to monitor the security situation surrounding a road construction site. The computer program product involves a set of processor-executable instructions stored on a processor-readable medium. Execution of the set of processor-executable instructions causes a central processing unit to perform various operations that monitor the security situation of the road construction site that is safeguarded by at least one safety marker. The operations include receiving (1) a position data set (PDS) indicative of a current position of the safety marker, (2) a reference image data set (RDS) indicative of an initial state of the security situation, and (3) a control image data set (KDS) indicative of a current state of the security situation. In one operation, a correction data set (KRS) for correcting the position data set (PDS) is determined by evaluating the reference image data set (RDS) and the control image data set (KDS). The position data set (PDS) is corrected using the correction data set (KRS) to generate a corrected position data set (PDS'). The current position of the safety marker indicated by the corrected position data set (PDS') is compared to a predetermined target position of the safety marker. The operations also include generating an alarm signal (AS1) if the current position deviates from the target position.

In another embodiment, a method monitors the positioning of location markers in order to position and monitor objects on a physical area not limited to a construction site. For example, any deviation between the initial position and the current position of objects on a physical area, such as land, is monitored and used to update mapping. A physical area is marked with a location marker that includes a navigation module, a camera and a data transmission device for wireless data transmission. A position data set (PDS) that is indicative of a current position of the location marker is determined using the navigation module. The position data set (PDS) is transmitted to a central processing unit using the data transmission device. A reference image data set (RDS) indicative of an initial state of the physical area is captured using the camera. A control image data set (KDS) indicative of a current state of the physical area is acquired. The reference image data set (RDS) and the control image data set (KDS) are transmitted to the central processing unit. A correction data set (KRS) used to correct the position data set (PDS) is determined by evaluating the reference image data set (RDS) and the control image data set (KDS). The position data set (PDS) is corrected using the correction data set (KRS) to generate a corrected position data set (PDS'). The current position of the location marker as indicated by the corrected position data set (PDS') is compared to a predetermined target position of the location marker. An alarm signal (AS1) is generated if the current position of the location marker deviates from the target position of the location marker.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
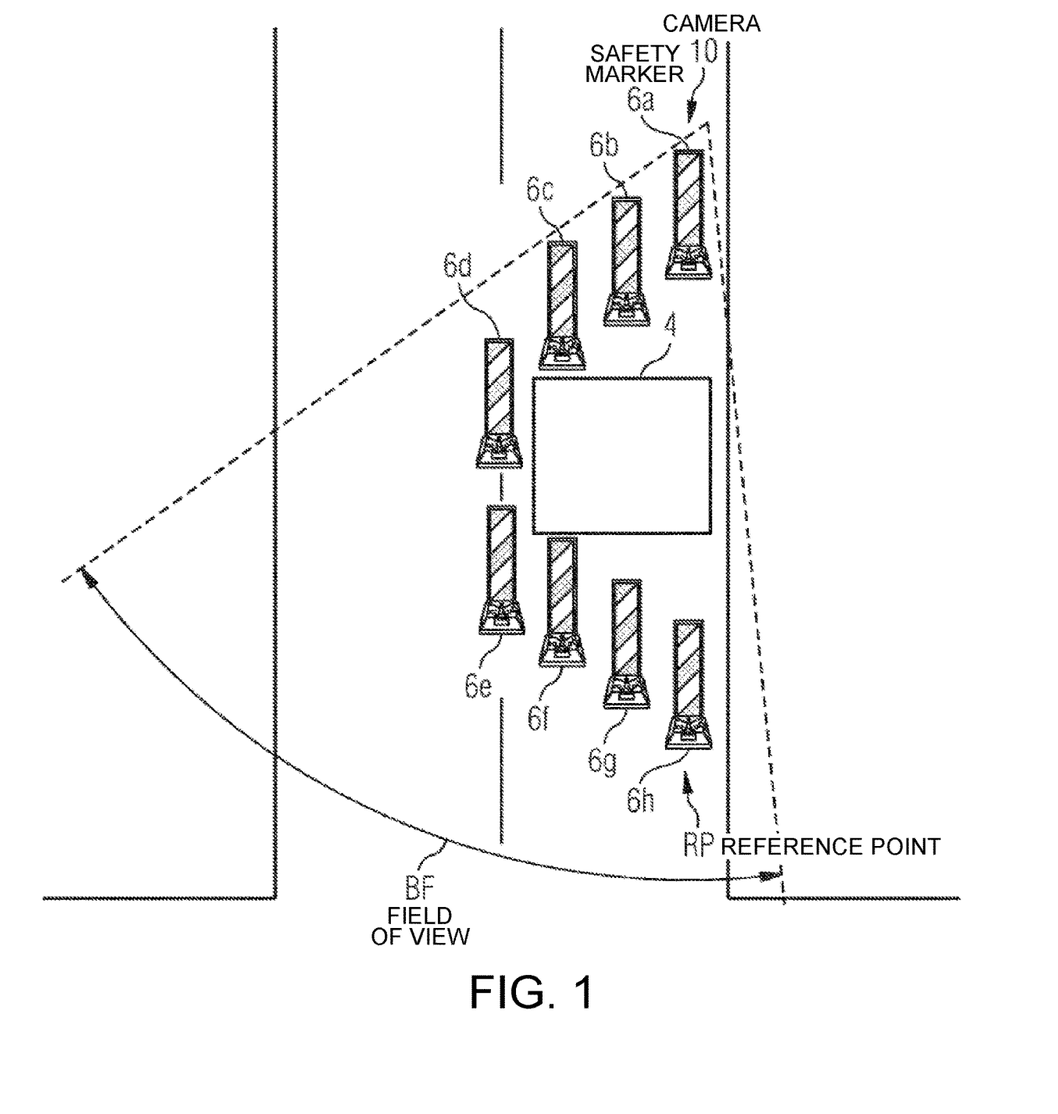
FIG. 1 is a schematic diagram of a road construction site.

FIG. 1 shows a construction site 4 on a two-lane road, where one of the two lanes has been closed to divert the traffic around the construction site 4. Safety markers 6 are arranged around the construction site 4 in such a way that the traffic is guided around the construction site 4 with a sufficient safety distance. A camera 10 disposed on one of the safety markers 6a has a field of view indicated by the arch BF. The label RP denotes an optically prominent or distinctive reference point in the security situation surrounding the road construction site 4.

The task of the invention is solved by a method for monitoring the security situation of a road construction site 4, including the steps:

securing the road construction site 4 with at least one safety marker 6, wherein the safety marker 6 includes a navigation module 8, the camera 10 and a data transmission device 12 for wireless data transmission;

determining from a position record indicative of a current actual position of the safety marker 6 using the navigation module 8;

transferring the position data set to a central processing unit 14;

capturing a reference image data set with the camera 10 indicative of an initial condition of the security situation;

transferring the reference image data set to the central processing unit 14;

capturing a control image dataset indicative of a current condition of the security situation;

transferring the control image data set to the central processing unit 14;

determining a correction data set for correcting the position data set by evaluating at least the reference image data set and the control image data set;

correcting the position data set with the correction data set to create a corrected position data set;

comparing an actual position of the safety marker 6 to the corrected position data set with a predetermined target position of the safety marker 6; and generating an alarm signal when the actual position of the safety marker 6 deviates from the set position.

Thus, it is proposed to additionally supplement the data of a satellite-based navigation system, such as a GPS or differential GPS system, which has a limited accuracy, with data obtained by evaluating a comparison of image data that is representative of the state of the security situation at the time of its commissioning and representative of the state of the security situation at a later control time. Of course, several control image data sets can be acquired and compared with the reference image data set, whereby the control image data sets are acquired within predetermined time intervals, e.g., once a day. In this way, the accuracy of the position detection of the safety markers 6 can be increased.

According to one embodiment, the following substeps are performed to determine the correction data set:
 searching for an optically distinctive reference point RP in the reference image dataset;
 determining a reference image data set indicative of a position of the optically distinctive reference point RP;
 searching for the optically distinctive reference point RP in the control image dataset;
 determining a control point position data set indicative of a position of the optically distinctive reference point RP in the control image data set; and
 determining the correction data set by comparing the reference image data set with the control point position data set.

Thus, the reference image data set and the control image data set are searched for a reference point RP. The optically distinctive reference point RP is easy to identify optically by means of image processing methods due to its shape or form. The reference point RP may be another safety marker 6. In other words, it is not absolute values but predetermined distances between safety markers 6 that are recorded and evaluated in order to detect deviations.

Furthermore, the reference point RP can also be, for example, a road intersection or road junction, but also special buildings whose exact position is known and therefore serve as the basis for the exact position data set. The correction data set then indicates the erroneous offset caused by the inaccuracy of the navigation system. In this way, the accuracy of the position detection of the safety markers can be increased in a particularly simple and reliable manner.

In another embodiment, a trained artificial neural network is used to search for the optically prominent or distinctive reference point RP in the reference image data set and/or to search for the optically distinctive reference point RP in the control image data set. Such an artificial neural network is trained during a training phase before it is put into operation. During the training phase, the artificial neural network is modified to produce associated output patterns for specific input patterns. This can be done using supervised learning, unsupervised learning, reinforcement learning, or stochastic learning. The advantage of a trained artificial neural network is that it benefits from its ability to learn, its parallelism, its fault tolerance and its robustness against disturbances.

In another embodiment, the reference image data set is compared with the control image data set to detect impairment in the security situation. A further alarm signal is generated when impairment or damage has been detected to a safety marker 6. The damage may be, for example, the consequence of severe weather, resulting, for example, in a safety marker 6 being substantially at its nominal position, but another safety marker 6 having fallen over, for example. Further damage can be that a safety marker 6 has disappeared, is damaged or is no longer functional because its lighting is defective. Such a safety marker 6 that has fallen over can be detected by evaluating the control image data set, i.e., by comparing it with the reference image data set. Thus, another, additional possibility of controlling the security situation of a road construction site 4 is created that can supplement or replace the personal control of the security situation of the road construction site 4 by a person on site.

In another embodiment, another trained artificial neural network is used to detect damage to the security situation. In this way, the aforementioned advantages of artificial neural networks can also be used to detect such damage.

Further, the invention includes a computer program product, a safeguarding system, and a safety marker 6 for such a system.

FIG. 1 shows a road with two lanes, where an assembled road construction site 4 has resulted in the closure of one of the two lanes. A road construction site is understood to be a location where a road and/or other infrastructure elements are constructed, modified, maintained or demolished. The description of the security situation is applicable to any construction site, not just to the construction or maintenance of roads. In the present scenario, the two-lane road begins or ends in a cross street.

In order to safeguard the road construction site 4, e.g., to protect persons working on the construction site 4, a safeguard has been formed in the present embodiment that, in accordance with a traffic law guideline, involves eight safety markers 6a, 6b, 6c, 6d, 6e, 6f, 6g, 6h, which are arranged around the construction site 4 in such a way that traffic is guided around the construction site 4 with a sufficient safety distance.

In the security situation shown in FIG. 1, at least the safety marker 6a has a camera 10, and the further safety marker 6h is located in the field of view BF of the camera 10 and serves as a reference point RP. In addition, the junction at which the two-lane road begins or ends can also be used as a reference point RP in an analogous manner. A curb, for example, in this area can also serve as a stationary point.

Furthermore, a fixed point whose coordinates are known can also serve as a reference point RP, such as the median strip of the road. Thus, for example, the exact positions of the safety markers 6d and 6e shown in FIG. 1 are also known. In the present embodiment, the safety markers 6 are each designed as a construction site guide beacon.

Figures 2, 3:
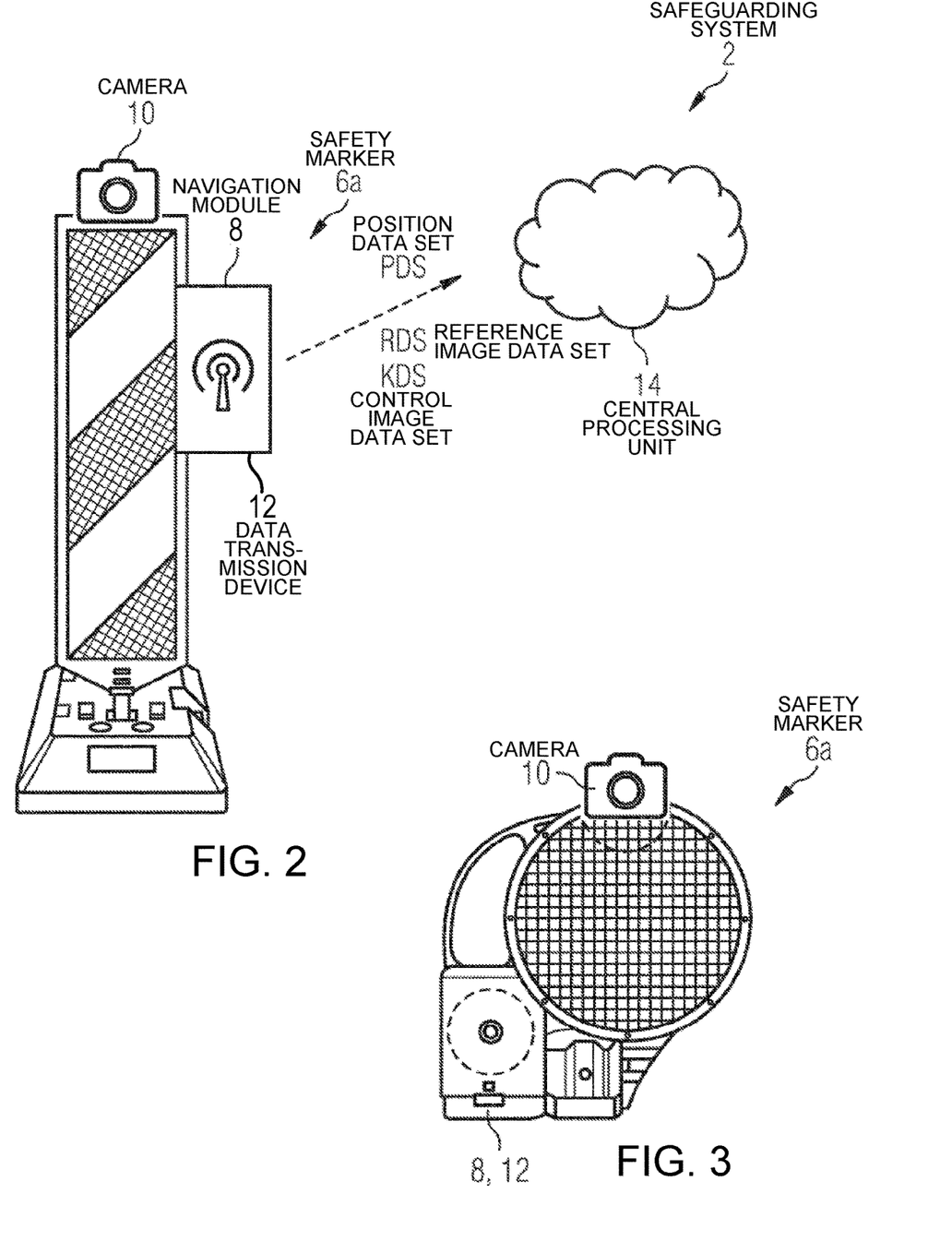
FIG. 2 schematically shows further details of one of the safety markers shown in FIG. 1 coupled to a central processing unit.
FIG. 3 is a schematic representation of an alternative embodiment of a safety marker.

FIG. 2 shows safety marker 6a in more detail. In order to implement an automated control of the security situation of the road construction site 4, a safeguarding system 2 is provided that comprises the safety marker 6a and a central processing unit 14. For example, the central processing unit 14 is a server accessible via the Internet using wireless communications from the safety marker 6a. The safety marker 6a has a navigation module 8, the camera 10 and a data transmission device 12 as additional components to the components of a typical construction site guidance beacon or vertical panel.

The navigation module 8 is configured to determine a current actual position of the safety marker 6a and to provide this position at predetermined time intervals in the form of a position data set PDS. The position data set PDS may, for example, have geographic coordinates representative of the current actual position of the safety marker 6. The navigation module 8 may be a satellite-based navigation system, such as GPS, Differential GPS (DGPS), or the GALILEO system.

The camera 10 is designed to capture image data of the environment surrounding the current actual position of the safety marker 6a and to provide the data at likewise predetermined time intervals in the form of a reference image data set RDS and a control image data set KDS. The camera 10 may, for example, be a CCD camera. The reference image data set RDS is indicative of an initial state of the security situation at the time of its commissioning or acceptance, while the control image data set KDS is indicative of the current state of the security situation at the time of its subsequent inspection, in each case according to the field of view BF (see FIG. 1) of the camera 10.

Both the position data set PDS and the reference image data set BDS, as well as later the control image data set KDS, are read in by the data transmission device 12 during operation and then transmitted wirelessly to a central processing unit 14 to be evaluated there. The data transmission device 12 can be designed for data transmission in accordance with a mobile radio standard, such as 5G.

In one embodiment, the position data set PDS as well as the reference image data set RDS and the control image data set KDS are each provided with a time stamp before being separately transmitted to the central processing unit 14. In one aspect, the position data set PDS and the image data set BDS are combined into a single data set and then time-stamped before being transmitted to the central processing unit 14. Furthermore, more than one of the safety markers 6a shown in FIG. 1 may be formed in the manner described with reference to FIG. 2. In other words, at least two or more of the safety markers 6a, 6b, 6c, 6d, 6e, 6f, 6g, 6h may be so formed.

FIG. 3 shows another embodiment of a safety marker 6a designed as a construction site warning light, which also has a navigation module 8, a camera 10 and a data transmission device 12 as additional components.

Figure 4:
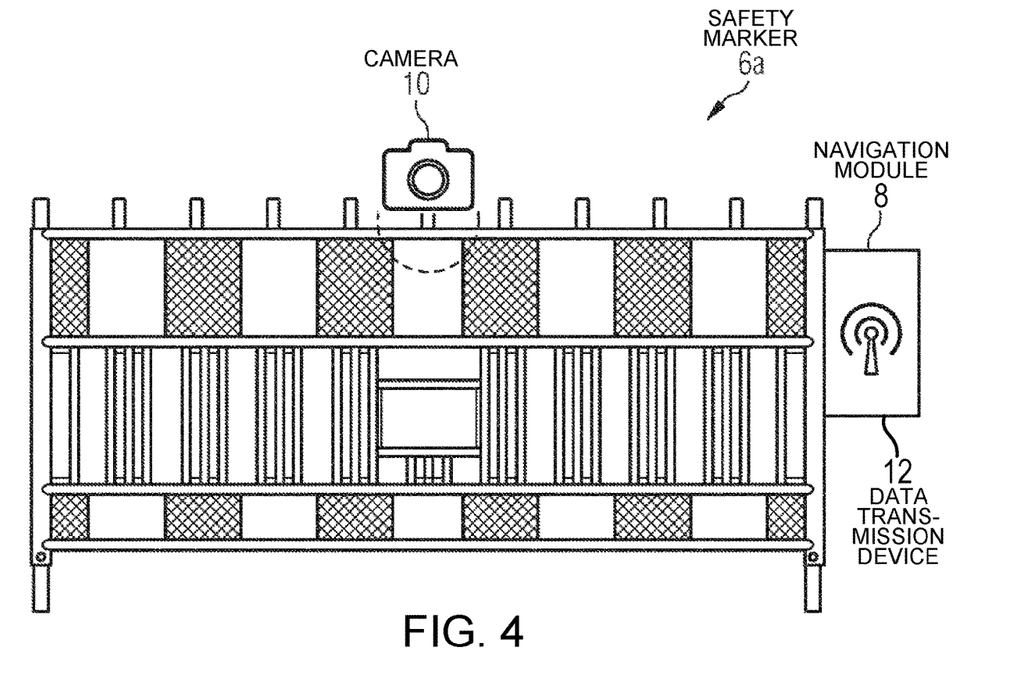
FIG. 4 is a schematic representation of an additional, alternative embodiment of a safety marker.

FIG. 4 shows yet another embodiment of a safety marker 6a in the form of a barrier panel or barricade, which also has a navigation module 8, a camera 10 and a data transmission device 12 as additional components.

Figure 5:
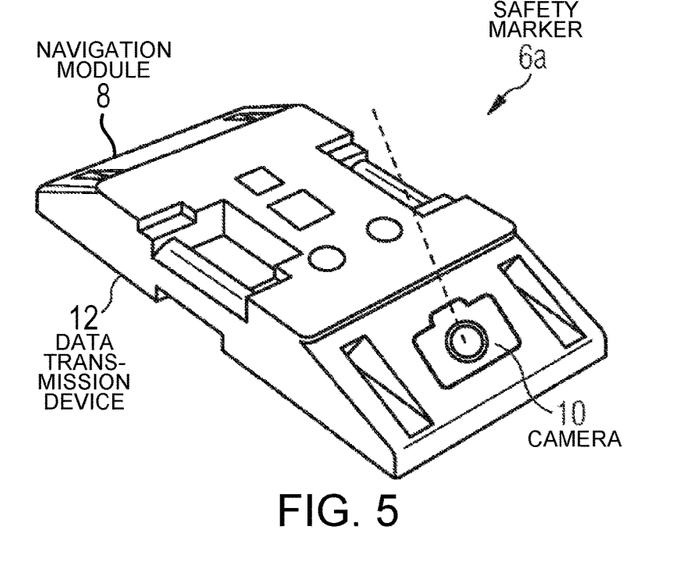
FIG. 5 is a schematic representation of a further, alternative embodiment of a safety marker.

Finally, FIG. 5 shows a safety marker 6a designed as a weighted base for a construction site guidance beacon or vertical panel, which also has a navigation module 8, a camera 10 and a data transmission device 12 as additional components.

It is advantageous to arrange the safety marker 6a or to align the camera 10 in such a way that at least the reference point RP is located in the field of view BF (see FIG. 1) of the camera 10. Furthermore, the safety marker 6a should, if possible, be oriented in such a way that the construction site 4 and/or the other safety markers 6b, 6c, 6d, 6e, 6f, 6g, 6h lie in the field of view of the camera 10.

Figure 6:
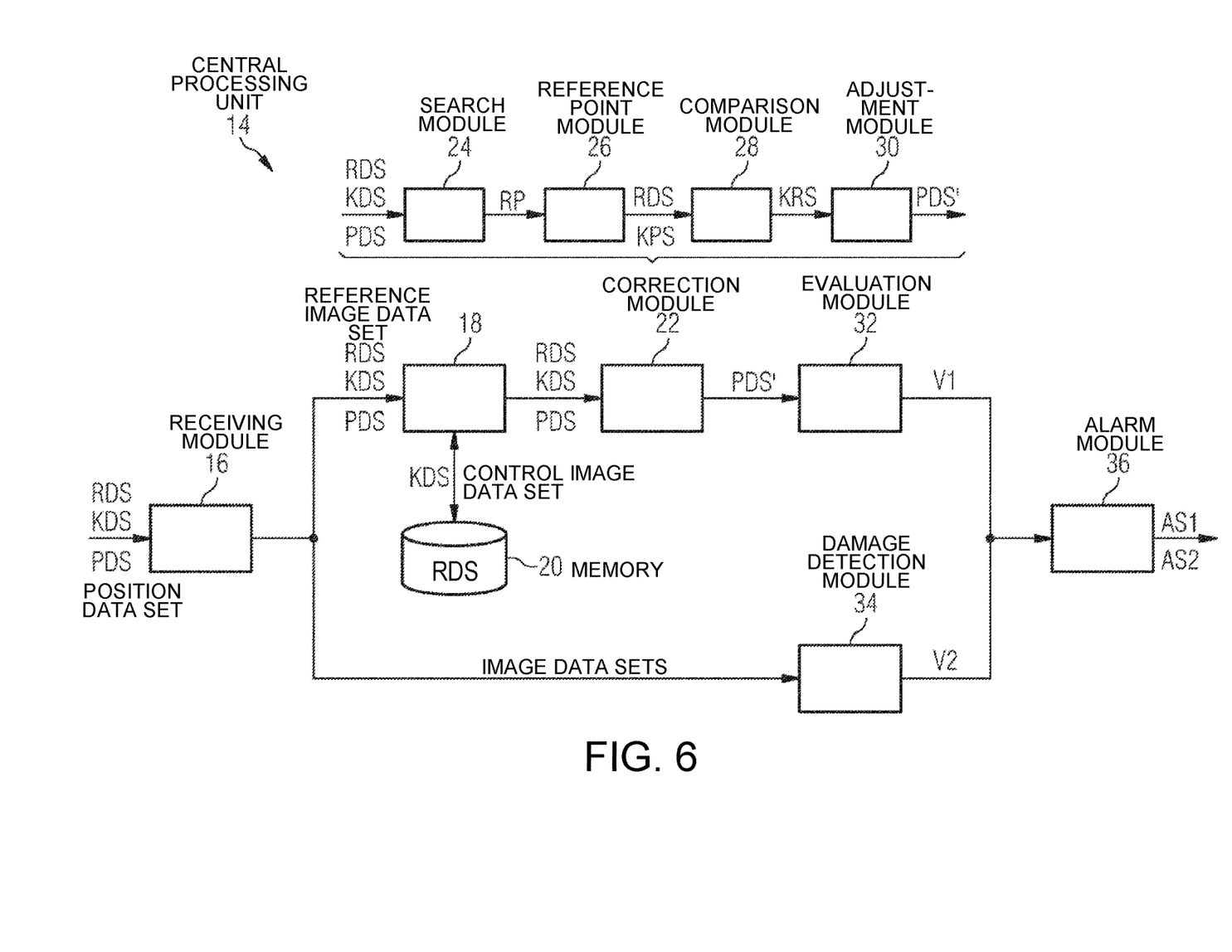
FIG. 6 shows further details of the central processing unit shown in FIG. 2.

FIG. 6 shows further details of the central processing unit 14. In the present embodiment, the central processing unit 14 is configured as a cloud computer. However, in other embodiments, the central processing unit 14 can also have a different computer configuration, such as a single computer, or be part of a different computer network.

In the embodiment of FIG. 6, the central processing unit 14 has a receiving module 16, a selection module 18, a memory 20, a correction module 22, an evaluation module 32, a damage detection module 34, and an alarm module 36. These components may have hardware and/or software components for their tasks and/or functions described below. In the present embodiment, the correction module 22 includes a search module 24, a reference point module 26, a comparison module 28, and an adjustment module 30.

Figure 7:
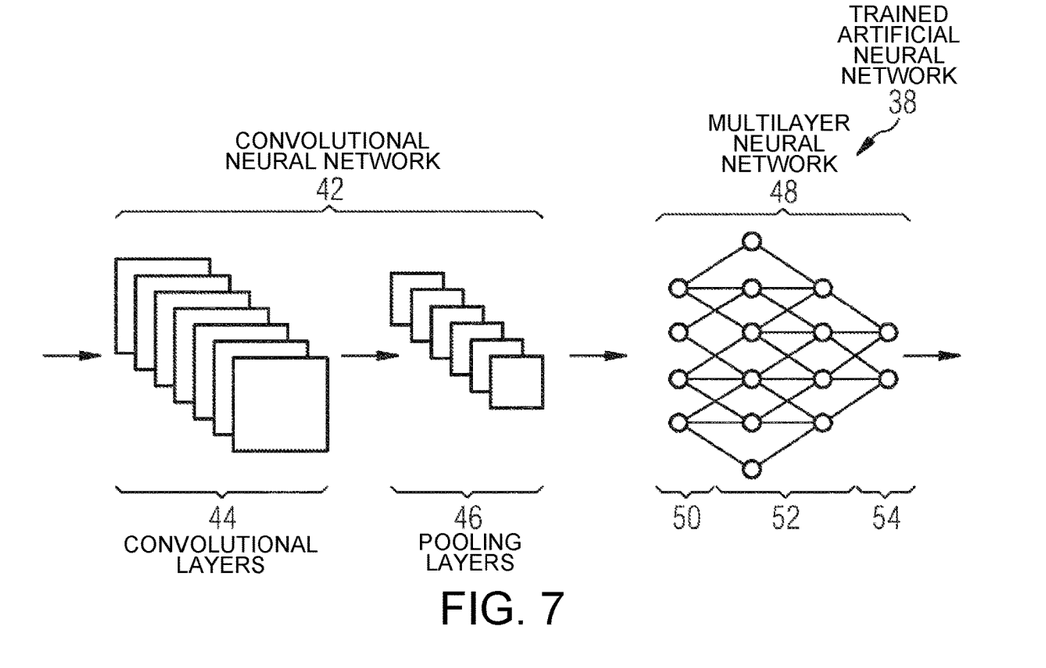
FIG. 7 shows further details of the central processing unit shown in FIG. 2.

Furthermore, in the present embodiment, the search module 24 has a trained artificial neural network 38 (see FIG. 7). Furthermore, in the present embodiment, the damage detection module 34 includes another trained artificial neural network 40 (see FIG. 8).

The receiving module 16 is configured to receive the position data set PDS and the reference image data set RDS as well as the control image data set KDS. The selection module 18 is configured to temporarily store into and read from the memory 20 the reference image data set RDS acquired when the safeguarding system 2 is put into operation when a control image data set KDS is present.

Additionally or alternatively, a map module (not shown) may be provided for determining a map data set indicative of the surroundings of the current actual position of the safety marker 6a by evaluating the position data set PDS. For this purpose, the map module reads the map data set archived in the memory 20. The map data set, e.g., according to the navigation data standard (NDS) or another GPS standard, has at least one exact position data set indicative of the optically prominent or distinctive reference point RP in the vicinity of the current actual position of the safety marker 6a, such as a curb in the area of the road junction and/or a center strip of the road. The exact position data set may have, for example, geographic coordinates indicative of the optically distinctive reference point RP.

The optically distinctive reference point RP is easy to identify visually due to its shape or form. In the present embodiment, the reference point RP is another safety marker 6 of the safeguarding system 2. In another embodiment, the reference point RP may also be a road intersection or junction, or even a particular building with a characteristic silhouette whose exact position is known.

The correction module 22 is configured to determine a correction data set KRS for correcting the position data set PDS by evaluating at least the reference image data set RDS and the control image data set KDS. The correction data set KRS can be understood as a displacement vector or can be designed as such.

The correction module 22 includes a search module 24, a reference point module 26, a comparison module 28 and an adjustment module 30. The search module 24 automatically searches for the optically distinctive reference point RP in the reference image data set RDS and in the control image data set KDS. The reference point module 26 determines the reference image data set RDS indicative of a position of the optically distinctive reference point RP and determines a control point position data set KPS indicative of the position of the optically distinctive reference point RP in the control image data set KDS. The comparison module 28 compares the reference image data set RDS with the control point position data set KPS to determine the correction data set KRS. The adjustment module 30 corrects the position data set PDS with the correction data set KRS. The reference image data set RDS as well as the control point position data set KPS may, for example, have geographic coordinates indicative of the position of the respective detected reference point RP.

In the present embodiment, the search module 24 and the reference point module 26 each have a dual function, namely, on the one hand, to search for a reference point RP in the respective image data, and on the other hand, to determine the reference image data set RDS and the control point position data set KPS. In another embodiment, the central processing unit 14 may also include two search modules 24 and/or two reference point modules 26.

The search module 24 includes the trained artificial neural network 38 in order to perform the searches and to determine the data sets. Artificial neural networks (ANN) are networks of artificial neurons. These neurons (also called nodes) of an artificial neural network are arranged in layers and are usually connected in a fixed hierarchy. The neurons are usually connected between two layers, but in rarer cases also within a layer.

FIG. 7 illustrates an artificial neural network 38 that is trained during a training phase before being put into operation. During the training phase, the artificial neural network is modified so that it generates associated output patterns for certain input patterns. This may be done using supervised learning, unsupervised learning, reinforcement learning, or stochastic learning. The use of a trained artificial neural network offers the advantage of benefiting from its learning ability, parallelism, fault tolerance, and robustness to disturbances.

The evaluation module 32 shown in FIG. 6 is designed to compare the actual position according to the corrected position data set PDS' with a predetermined target position of the safety marker 6 according to the traffic law guideline. In this embodiment, if the actual position matches the target position, the evaluation module 32 assigns the value logical one to a logical variable V1, otherwise it assigns the value logical zero.

The damage detection module 34 is adapted to evaluate the control image data set KDS in order to detect damage or impairment to the safety marker being analyzed. Damage or impairment may be, for example, caused by severe weather conditions resulting in, for example, one of the safety markers 6 being substantially at its nominal position (i.e., within lower limits by which the actual position can be detected), but another safety marker 6 having fallen over. Further damage may be that a safety marker 6 has disappeared from the area of the construction site 4, is damaged, or is no longer functional because, for example, its light is defective. Such a fallen safety marker 6 can be detected by evaluating the control image data set KDS. In this case, the damage detection module 34 assigns the value logical one to another logical variable V2, otherwise the value is logical zero.

The damage detection module 34 may have an additional trained artificial network 40 for this purpose. The additional neural network 40 of the damage detection module 34 may have the same architecture as the neural network 38 of the search module 24.

Notwithstanding the above, the additional artificial neural network 40 may also comprise an autoencoder. An autoencoder is a device or algorithm that provides a map of an original input. Thus, an autoencoder with an encoder and a decoder is first trained during a training phase to map training data to reference data, in other words to provide copies of the training data as reference data. During training, the autoencoder's ability to detect differences between the training data and the reference data is exploited to achieve a learning progress.

The same ability to detect differences between training data and reference data is used in a normal operation after the training phase is completed to detect differences between current data and reference data. Further details of another embodiment of the additional artificial neural network 40 with an autoencoder are discussed with regard to FIG. 8.

The alarm module 36 is designed to generate an alarm signal AS1 when the actual position deviates from the set position. Furthermore, the alarm module 36 is designed to generate a further alarm signal AS2 if there is damage to the safety marker 6.

FIG. 7 illustrates that the artificial neural network 38 may have, on the input side, a convolutional neural network 42 (CNN) for classification with one or more convolutional layers 44 followed by a pooling layer 46. The convolutional neural network 38 may be followed by another artificial multilayered or deep neural network 48 having an input layer 50, a plurality of intermediate layers 52, and an output layer 54. The multilayered neural network may be a recurrent neural network (RNN). Recurrent neural networks (RNN) are artificial neural networks that, in contrast to feedforward neural networks, are characterized by connections from neurons of one layer to neurons of the same or a previous layer.

The artificial neural network 38 is subjected to training data sets during a training phase before it is put into operation. For example, by means of the method of backpropagation of error, the artificial neural network 38 is trained by changing weight factors of the artificial neurons of the artificial neural network 38 in order to achieve the most reliable mapping of given input vectors to given output vectors. Furthermore, the artificial neural network 38, in particular the multilayered neural network, may have a long short-term memory (LSTM) to improve training results. Training can be done using supervised, unsupervised, or reinforcement learning.

Figure 8:
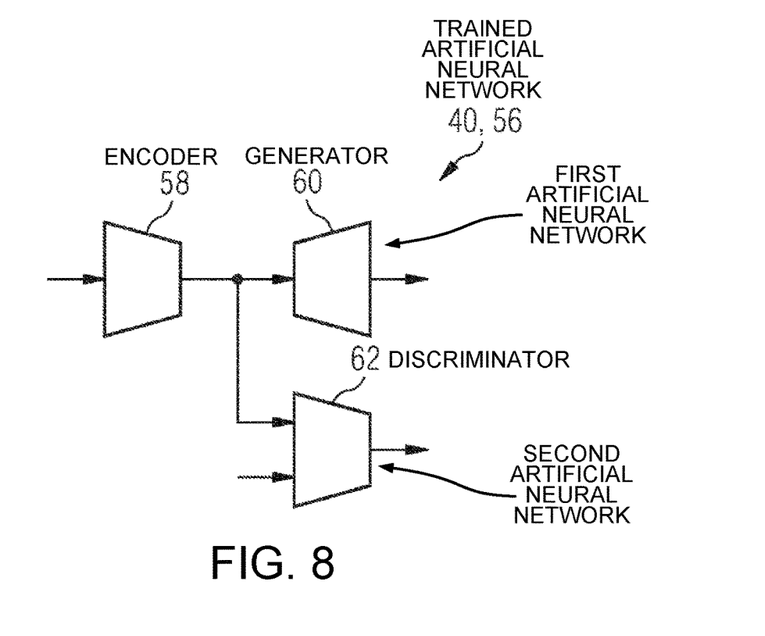
FIG. 8 shows further details of the central processing unit shown in FIG. 2.

FIG. 8 illustrates further details of the additional artificial neural network 40 with an autoencoder 56. In one embodiment, the autoencoder 56 is a generative adversarial autoencoder. Such an autoencoder can also be understood as a probabilistic autoencoder. The autoencoder has a generative neural network (GAN) with a first and a second artificial neural network and an encoder 58. The first artificial neural network is designed as a generator 60, and the second artificial neural network is designed as a discriminator 62. During a training phase, the generator 60 and the discriminator 62 perform a zero-sum game. Here, the generator 60 generates reference data, e.g., based on random values, while the discriminator 62 evaluates the reference data. For this purpose, the discriminator 62 performs a comparison of the reference data with real data sets. The generative neural network (GAN) is used to update the discriminator 62. Thereby, the discriminator 62 enables a particularly reliable detection of such deviations in contrast to, for example, artificial neural networks, such as multilayered neural networks.

Figure 9:
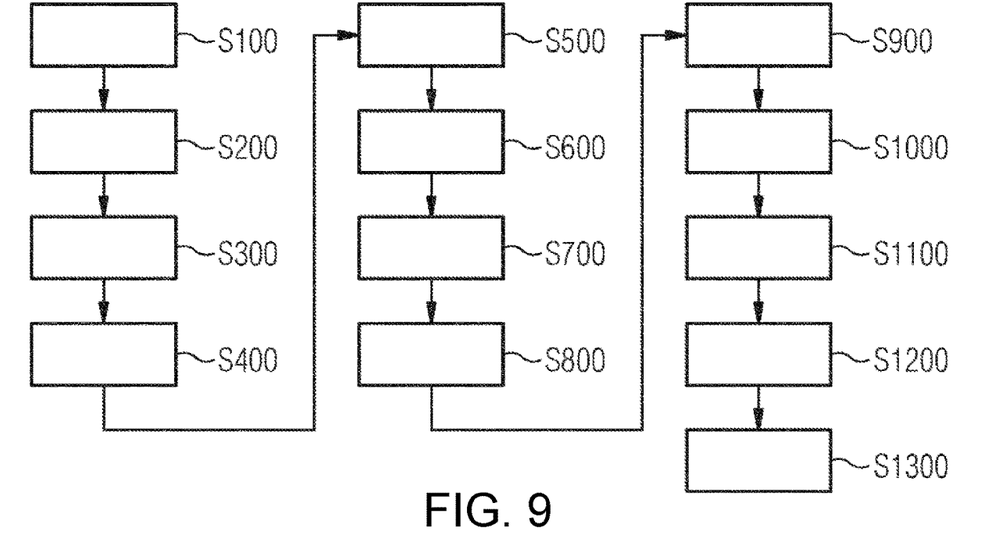
FIG. 9 shows a schematic diagram of the sequence of method steps.
Figure 10:
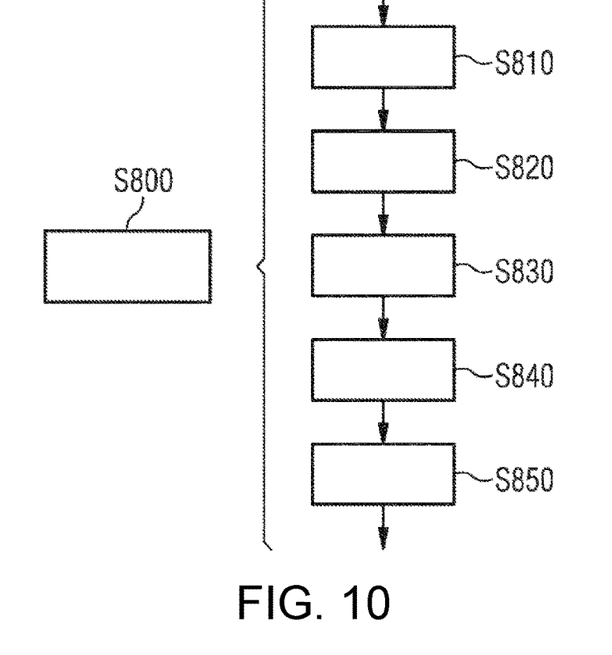
FIG. 10 shows further details of the method shown in FIG. 9.

FIGS. 9-10 illustrate the procedural sequences for operating the safeguarding system 2. In a first step S100, the road construction site 4 is secured with the safety markers 6 in accordance with the traffic law guideline. Then in step S200, the navigation module 8 determines the position data set PDS indicative of the current actual position of the safety marker 6a. In step S300, the position data set PDS is transmitted wirelessly to the central computer unit 14 by means of the data transmission device 12 and is received there by the receiving module 16.

In step S400, the camera 10 captures the reference image data set RDS indicative of an initial state of the security situation in the field of view BF. In step S500, the reference image data set RDS is also transmitted wirelessly to the central processing unit 14 by means of the data transmission device 12 and is also received there by the receiving module 16 and temporarily stored in the memory 20 by selection module 18. In step S600, the control image data set KDS indicative of the current state of the security situation is acquired with the camera 10.

In step S700, the control image data set KDS is transmitted wirelessly to the receiving module 16 of the central processing unit 14 by means of the data transmission device 12. In step S800, the correction module 22 evaluates the reference image data set RDS and the control image data set KDS temporarily stored in the memory 20 to determine the correction data set KRS for correcting the position data set PDS.

In a substep S810, the search module 24 uses the additional artificial neural network 38 to search the reference image data set RDS for the optically prominent and distinctive reference point RP. When the reference point RP has been found, in substep S820, the reference point module 26 determines the reference image data set RDS indicative of the position of the optically distinctive reference point RP. In substep S830, the search module 24 searches the control image data set KDS for the optically distinctive reference point RP. In substep S840, the reference point module 26 also determines the control point position data set KPS indicative of a position of the optically distinctive reference point RP in the control image data set KDS. In substep S850, the comparison module 28 compares the reference image data set RDS with the control point position data set KPS to determine the correction data set KRS.

In a further step S900, the adjustment module 30 then corrects the position data set PDS with the correction data set KRS to determine the corrected position data set PDS'. In step S1000, the evaluation module 32 compares the actual position according to the corrected position data set PDS' with the predetermined target position of the safety marker 6 according to the traffic law guideline. If the actual position does not match the set position, the alarm module 36 generates the alarm signal AS1.

In step S1200, the damage detection module 34 with the additional artificial neural network 40 compares the reference image data set RDS with the control image data set KDS to detect impairment to the security situation. For this purpose, both the reference image data set RDS and the control image data set are searched for the reference point RP as described above in order to determine deviations that are considered indicative of impairment to the security situation.

When such impairment or damage has been detected, in step S1300, the alarm module 36 generates the further alarm signal AS2. In response to the presence of the alarm signal AS1 and/or the further alarm signal AS2, a personal check of the safeguarding of the road construction site 4 can be triggered by a person on site. This can also include a prior inspection of the reference image data sets RDS by the person before he/she goes to the construction site 4 for the personal check in order to verify and, if necessary, eliminate the impairment or damage.

Additionally or alternatively, a map module evaluates the position data set PDS to determine a map data set archived in the memory 20 indicative of the vicinity of the current actual position of the safety marker 6. The map data set has at least one exact position data set indicative of the optically distinctive reference point RP in the vicinity of the current actual position of the safety marker 6a.

In another embodiment, the sequence of the steps can be different. Furthermore, multiple steps can be executed simultaneously. Moreover, individual steps can be skipped or omitted compared to the embodiment described above. For example, steps S600 to S1100 including substeps S810 to S850 and steps S1200 and S1300 can be executed in a different sequence or simultaneously. The same applies analogously to steps S200 and S300 and steps S400 and S500. Furthermore, only steps S100 to S1100 including substeps S810 to S850 or only steps S100 and S400 to S700 and S1200 and S1300 need be executed, for example.

The method can be used to increase the accuracy of the position detection of the safety elements 6a, 6b, 6c, 6d, 6e, 6f, 6g, 6h by additionally evaluating control image data sets KDS of the surroundings of the safety marker 6 by comparing them to the reference image data set RDS. Furthermore, by evaluating the control image data sets KDS, impairment to the safeguarding of the construction site 4 can be detected.

In another embodiment, the novel method is used generally to position and monitor objects on a physical area and not just to position safety markers at a road construction site. Monitoring any deviation between the initial position and the current position of objects on a physical area, such as land, can be used for mapping, for example.

The method of monitoring the positioning of location markers involves marking a physical area with at least one location marker. The location marker includes a navigation module, a camera and a data transmission device for wireless data transmission. A position data set (PDS) is determined that is indicative of a current position of the location marker using the navigation module. The position data set (PDS) is then transmitted to a central processing unit using the data transmission device. For example, position data set (PDS) is transmitted via wireless data transmission. A reference image data set (RDS) is captured that is indicative of an initial state of the physical area using the camera. For example, the physical area is a field, a parcel of real estate, or an urban neighborhood. The reference image data set (RDS) is then transmitted to the central processing unit. A control image data set (KDS) is acquired that is indicative of a current state of the physical area. The control image data set (KDS) is transmitted to the central processing unit.

A correction data set (KRS) is determined for correcting the position data set (PDS) by evaluating the reference image data set (RDS) and the control image data set (KDS). The correction data set (KRS) is determined by (i) searching for an optically distinctive reference point (RP) in the reference image data set (RDS), (ii) determining a point in the reference image data set (RDS) indicative of a position of the optically distinctive reference point (RP), (iii) searching for the optically distinctive reference point (RP) in the control image data set (KDS), (iv) determining a control point position data set (KPS) indicative of the position of the optically distinctive reference point (RP) in the control image data set (KDS); and (v) determining the correction data set (KRS) by comparing the point in the reference image data set (RDS) to the control point position data set (KPS). The position data set (PDS) is corrected using the correction data set (KRS) to generate a corrected position data set (PDS'). The current position of the location marker as indicated by the corrected position data set (PDS') is compared to a predetermined target position of the location marker. An alarm signal (AS1) is generated if the current position of the location marker deviates from the target position of the location marker.

LIST OF REFERENCE NUMERALS 2 safeguarding system
4 road construction site
6 safety marker
8 navigation module
10 camera
12 data transmission device
14 central processing unit
16 receiving module
18 selection module
20 memory
22 correction module 24 search module
26 reference point module
28 comparison module
30 adaptation module
32 evaluation module
34 damage detection module
36 alarm module
38 artificial neural network
40 additional artificial neural network
42 convolutional neural network
44 convolutional layer
46 pooling layer
48 multilayered neural network
50 input layer
52 intermediate layers
54 output layer
56 autoencoder
58 encoder
60 generator
62 discriminator
AS1 alarm signal
AS2 alarm signal
BF field of view
EPD exact position record
KDS control image data set
KPS control point position data set
KRS correction data set
PDS position data set
PDS' corrected position data set
RDS reference image data set
RP reference point
V1 logical variable
V2 logical variable
S100 Step
S200 Step
S300 Step
S400 Step
S500 Step
S600 Step
S700 Step
S800 Step
S810 Substep
S820 Substep
S830 Substep
S840 Substep
S850 Substep
S900 Step
S1000 Step
S1100 Step
S1200 Step
S1300 Step Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of monitoring a security situation of a road construction site, comprising:
   safeguarding the road construction site with a safety marker, wherein the safety marker includes a navigation module, a camera and a data transmission device for wireless data transmission;
   determining a position data set indicative of a current position of the safety marker using the navigation module;
   transmitting the position data set to a central processing unit;
   capturing a reference image data set indicative of an initial state of the security situation using the camera;
   transmitting the reference image data set to the central processing unit;
   acquiring a control image data set indicative of a current state of the security situation;
   transmitting the control image data set to the central processing unit;
   determining a correction data set for correcting the position data set by evaluating the reference image data set and the control image data set;
   correcting the position data set using the correction data set to generate a corrected position data set;
   comparing the current position of the safety marker indicated by the corrected position data set to a predetermined target position of the safety marker; and
   generating an alarm signal if the current position deviates from the target position.

2. The method of claim 1, wherein the correction data set is determined by performing the following substeps:
   searching for an optically distinctive reference point in the reference image data set;
   determining a point in the reference image data set indicative of a position of the optically distinctive reference point;
   searching for the optically distinctive reference point in the control image data set;
   determining a control point position data set indicative of the position of the optically distinctive reference point in the control image data set; and
   determining the correction data set by comparing the point in the reference image data set to the control point position data set.

3. The method of claim 2, wherein a trained artificial neural network is used for searching for the optically distinctive reference point in the reference image data set and for searching for the optically distinctive reference point in the control image data set.

4. The method of claim 1, further comprising:
   comparing the reference image data set to the control image data set to detect impairment to the security situation; and
   generating a second alarm signal if impairment to the security situation has been detected.

5. The method of claim 4, wherein a second trained artificial neural network is used to detect impairment to the security situation.

6. The method of claim 1, wherein the central processing unit is a server accessible via the wireless data transmission.

7. A set of processor-executable instructions stored on a non-transitory processor-readable medium, wherein execution of the set of processor-executable instructions causes a central processing unit to perform operations including:
   receiving a position data set indicative of a current position of a safety marker, wherein a road construction site is safeguarded by the safety marker;
   receiving a reference image data set indicative of an initial state of a security situation surrounding the road construction site;
   receiving a control image data set indicative of a current state of the security situation;

determining a correction data set for correcting the position data set by evaluating the reference image data set and the control image data set;

correcting the position data set using the correction data set to generate a corrected position data set;

comparing the current position of the safety marker indicated by the corrected position data set to a predetermined target position of the safety marker; and generating an alarm signal if the current position deviates from the target position.

8. The set of processor-executable instructions of claim 7, wherein the safety marker includes a navigation module, a camera and a data transmission device for wireless data transmission, wherein the position data set is determined using the navigation module, wherein the reference image data set is captured using the camera, and wherein the control image data set is transmitted to the central processing unit using the data transmission device.

9. A system for safeguarding a road construction site, comprising:

a safety marker comprising a navigation module, a camera and a data transmission device for wireless data transmission; and a central processing unit, wherein the road construction site is safeguarded by the safety marker, wherein the safety marker is configured to determine a position data set indicative of a current actual position of the safety marker using the navigation module, to transmit the position data set to the central processing unit, to acquire a reference image data set using the camera indicative of an initial state of the safety marker, to transmit the reference image data set to the central processing unit, to acquire a control image data set indicative of a current state of the security situation, and to transmit the control image data set to the central processing unit, wherein the central processing unit is configured to determine a correction data set for correcting the position data set by evaluating the reference image data set and the control image data set, to correct the position data set with the correction data set so as to generate a corrected position data set, to compare an actual position of the safety marker according to the corrected position data set with a predetermined target position of the safety marker, and to generate an alarm signal if the actual position deviates from the target position.

10. The system of claim 9, wherein the central processing unit is configured to search for an optically distinctive reference point in the reference image data set for determining the correction data set, to receive the reference image data set indicative of a position of the optically distinctive reference point, to search for the optically distinctive reference point in the control image data set, to determine a control point position data set indicative of the position of the optically distinctive reference point in the control image data set, and to determine the correction data set by comparing the reference image data set with the control point position data set.

11. The system of claim 10, wherein the central processing unit comprises a trained artificial neural network, and wherein the trained artificial neural network is used to search for the optically distinctive reference point in the reference image data set and to search for the optically distinctive reference point in the control image data set.

12. The system of claim 9, wherein the central processing unit is configured to compare the reference image data set with the control image data set to detect impairment to the security situation and to generate an additional alarm signal if impairment has been detected.

13. The system of claim 9, wherein the central processing unit comprises an additional trained artificial neural network, and wherein the additional trained artificial neural network is used to detect impairment to the security situation.

14. A method of monitoring the positioning of location markers, comprising:

marking a physical area with a location marker, wherein the location marker includes a navigation module, a camera and a data transmission device for wireless data transmission;

determining a position data set indicative of a current position of the location marker using the navigation module;

transmitting the position data set to a central processing unit using the data transmission device;

capturing a reference image data set indicative of an initial state of the physical area using the camera;

transmitting the reference image data set to the central processing unit;

acquiring a control image data set indicative of a current state of the physical area;

transmitting the control image data set to the central processing unit;

determining a correction data set for correcting the position data set by evaluating the reference image data set and the control image data set;

correcting the position data set using the correction data set to generate a corrected position data set;

comparing the current position of the location marker indicated by the corrected position data set to a predetermined target position of the location marker; and generating an alarm signal if the current position of the location marker deviates from the target position of the location marker.

15. The method of claim 14, wherein the correction data set is determined by:

searching for an optically distinctive reference point in the reference image data set;

determining a point in the reference image data set indicative of a position of the optically distinctive reference point;

searching for the optically distinctive reference point in the control image data set;

determining a control point position data set indicative of the position of the optically distinctive reference point in the control image data set; and determining the correction data set by comparing the point in the reference image data set to the control point position data set.

16. The method of claim 15, wherein a trained artificial neural network is used for searching for the optically distinctive reference point in the reference image data set and for searching for the optically distinctive reference point in the control image data set.

17. The method of claim 14, further comprising:

comparing the reference image data set to the control image data set to detect change in the physical area; and generating a second alarm signal if change in the physical area has been detected.

18. The method of claim 14, wherein the central processing unit is a server accessible via the wireless data transmission.

* * * * *